United States Patent [19]

Nguyen et al.

[11] Patent Number: 4,537,665

[45] Date of Patent: Aug. 27, 1985

[54] PRODUCTION OF ALUMINUM FOIL CAPACITOR ELECTRODES

[75] Inventors: Trung H. Nguyen, Williamstown, Mass.; Clinton E. Hutchins, Pownal, Vt.

[73] Assignee: Sprague Electric Company, North Adams, Mass.

[21] Appl. No.: 646,876

[22] Filed: Sep. 4, 1984

[51] Int. Cl.³ .................. C25D 11/10; C25D 11/12; C25D 11/16
[52] U.S. Cl. .................................. 204/29; 204/33; 204/42; 204/58
[58] Field of Search .................. 204/58, 42, 33, 29

[56] References Cited

U.S. PATENT DOCUMENTS 1,330,581  2/1920  Coulson.
3,767,541  10/1973  Curtis .............................. 204/56 R
4,204,919  5/1980  Randall, Jr. et al. ................ 204/29

FOREIGN PATENT DOCUMENTS 57-115815  7/1982  Japan.

Primary Examiner—R. L. Andrews

[57] ABSTRACT

In the production of low voltage aluminum foil capacitor electrodes, etched and clean foil is subjected to a thermal treatment at about 595° to 650° C. and then anodized in an adipate formation electrolyte. The electrolyte may contain a minor amount of a phosphate salt, or the final reanodization may be carried out in a phosphate electrolyte.

7 Claims, No Drawings

PRODUCTION OF ALUMINUM FOIL CAPACITOR ELECTRODES

BACKGROUND OF THE INVENTION

This invention relates to a method of producing low-voltage aluminum foil capacitor electrodes in which etched and cleaned foil is thermally treated at about 595° to 650° C. and then anodized in an adipate electrolyte which may also contain a phosphate. The process is particularly useful in making low-voltage foil, e.g., less than 100 V and, specifically, 0-60 V foil.

It has been known to thermally treat aluminum electrolytic capacitor foil. Cold rolled, or hard, foil is thermally treated (or annealled) to reduce its brittleness. Aluminum foil has been heat treated to produce a more crystalline oxide, and it has been heat treated during anodization to stabilize it.

Most of these processes are conducted well below the melting point of aluminum except for the annealling process during which there is crystal reorganization and growth.

Anodization of aluminum capacitor foil in both phosphate and dicarboxylic salt electrolytes is well-known also. To produce the barrier layer type anodic oxide, salts of the $C_4$-$C_{10}$ dicarboxylic acids are generally preferred with the lower acids, specifically adipates, finding more favor because they are more soluble and have good anodization efficiency.

Various electrolyte systems and various heat treatment schemes have been tried to improve capacitance. In some combinations, it was found that heat treatment reduced capacitance of low-voltage foils even though it improved it for intermediate and high-voltage foils.

In copending U.S. application Ser. No. 464,226, filed Feb. 7, 1983 and assigned to the same assignee as the present invention, J. J. Randall, Jr., T. H. Nguyen and C. E. Hutchins described the treatment of etched foil with a phosphate solution followed by heat treatment at 590° to 630° C. to form a thermal oxide layer which modifies the subsequently formed barrier oxide layer. This process described by Randall et al is directed to foils formed at intermediate to high voltages, e.g., 100 V and above. The process of the present invention is directed to improving capacitance at low anodization voltages, e.g., at less than 100 V and specifically 0-60 V.

SUMMARY OF THE INVENTION

This invention features the heat-treatment of etched, clean aluminum capacitor foil at about 595° to 650° C. and then anodization in an adipate electrolyte to improve low-voltage capacitance, e.g., less than 100 V and specifically 0-60 V. The anodization electrolyte may contain a phosphate or the final anodization step may be carried out in a phosphate anodization electrolyte.

Aluminum foil melts at about 675° C.; therefore, the heat treatment is carried out for up to at most 90 sec. near 595° C. and for at most 30 sec. at 650° C. This heat treatment combined with anodization in an adipate electrolyte improved low-voltage capacitance by 30 to 60%, with the greatest improvement at lower voltages, e.g., 30 V, compared to foil which had not been heat-treated.

The foil must be clean for obvious reasons; any residue will be baked onto the surface and into the etch structure of the foil. The cleaning material must remove or displace residual chloride ions from the etching process and in turn either be completely volatilized or form a residue which is innocuous as far as electrolytic capacitors are concerned. Organic reagents which will selectively displace chloride ions, e.g., citric acid or citrates, or inorganic acids such as nitric or phosphoric acid have been used as cleaning agents.

A small amount of phosphate is incorporated into the anodization electrolyte or the final anodization, actually reanodization, stage is carried out in a phosphate electrolyte to impart hydration resistance to the foil. As is well-known, aluminum foil bearing a barrier layer anodic oxide is very sensitive to moisture and will react with it, even from the ambient atmosphere, forming a hydrated oxide which will reduce the capacitance of the foil. It has become common to anodize aluminum capacitor foil to the desired voltage, stabilize the foil, and then reanodize to the desired voltage to heal any defects in an electrolyte which will impart hydration resistance. The foil can then be stored without capacitance change before being made into capacitors.

DESCRIPTION OF THE PREFERRED EMBODIMENTS

Etched and cleaned aluminum electrolytic capacitor foil is heat treated at about 595° to 650° C. and then anodized in an adipate electrolyte which may contain a phosphate. Low-voltage capacitance, specifically that in the 0-60 V range, is increased.

The adipate may be an alkali metal or ammonium salt, such as sodium or ammonium adipate. Other dicarboxylic acid salts known to be useful as anodizing electrolytes were tried but gave an unstable anodized foil when subjected to the heat treatment followed by anodization, for example, azelaic, glutaric and succinic acid salts. Ammonium dihydrogen phosphate was also evaluated but did not give the capacitance increase obtained with the adipate electrolyte.

With heat-treatment temperatures up to about 595° C., foil anodized in a phosphate electrolyte or an adipate electrolyte displayed about the same capacitance at 10 V and 30 V formations. Above 595° C., anodization in the adipate electrolyte gave a 30 to 60% capacitance increase in the 0-60 V formation range with the largest increase for 30 V formation. Thus, the process is useful for increasing capacitance of foil intended for low-voltage capacitors.

Since other known dicarboxylic acid anodizing electrolytes produce either unstable foil or foil with lower capacitance when used following the heat treatment at 595° to 650° C., it would appear that there is a synergistic effect in the combination of the heat treatment and formation in an aqueous adipate electrolyte. This apparent synergism is reinforced by the difference in results obtained with adipate vs. phosphate formation. The capacitances parallel each other at heat treatment temperatures up to about 540° C. when they begin to diverge. At about 595° C., the capacitance subsequently obtained with an aqueous adipate formation is significantly higher than with a phosphate formation.

EXAMPLE 1

This example shows the difference in adipate versus a standard phosphate formation following heat treatment at 538° C. and above. At the lower end of the range, heat-treatments were carried out for 45 to 135 sec. but only up to 40 sec. at the highest temperature used. The phosphate electrolyte was 0.1% ammonium dihydrogen phosphate (ADP) and the adipate was 5% diammonium adipate (DAA). The foil was 2.6 mil. thick aluminum foil which had been etched and cleaned and anodized to 10, 30, 60 and 100 V. The capacitance at each voltage is given in $\mu F/in^2$ of foil area, temperature is in °C., and time is in seconds. The anodization was carried out at each voltage level at 88° C. and 360 mA/in² (projected area) current density.

Comparative data are given below for 45 sec. at the lower heat-treatment temperature and 30 sec. at the upper end of the range.

TABLE 1

| Electrolyte | Heat treatment | | Capacitance, $\mu F/in^2$ | | | |
|---|---|---|---|---|---|---|
| | Temp. | Time | 10 V | 30 V | 60 V | 100 V |
| ADP | 538 | 45 | 336 | 117 | 51 | 25 |
| | 593 | 45 | 334 | 125 | 57 | 28 |
| | 649 | 30 | 319 | 149 | 66 | 29 |
| DAA | 538 | 45 | 372 | 129 | 65 | 33 |
| | 593 | 45 | 367 | 138 | 70 | 33 |
| | 649 | 30 | 400 | 167 | 72 | 31 |

There is little difference in 100 V capacitance at any heat treatment level but a large difference at lower voltages both with respect to heat treatment level and formation electrolyte. At about 595° C., a treatment time of up to 90 sec. is preferred while at about 650° C., the time should be no more than 40 sec. and, preferably, is 30 sec. so that foil will not start to soften and melt.

EXAMPLE 2

This example shows the difference for three different etched aluminum foils which have been anodized as above in the adipate electrolyte with or without heat-treatment. The first two foils are commercial DC etched foils, and the third is an AC etched foil. Heat-treatment was carried out at 649° C. for 30 sec.

TABLE 2

| Foil | Heat-treatment | Capacitance, $\mu F/in^2$ | | | |
|---|---|---|---|---|---|
| | | 10 V | 30 V | 60 V | 100 V |
| 1 | No | 489 | 148 | 73 | 40 |
| | Yes | 479 | 195 | 87 | 39 |
| | % increase | −2 | 32 | 19 | −2.5 |
| 2 | No | 410 | 140 | 77 | 40 |
| | Yes | 430 | 190 | 85 | 38 |
| | % increase | 5 | 36 | 10 | −5% |
| 3 | No | 395 | 110 | 58 | 30 |
| | Yes | 400 | 167 | 72 | 31 |

TABLE 2-continued

| Foil | Heat-treatment | Capacitance, $\mu F/in^2$ | | | |
|---|---|---|---|---|---|
| | | 10 V | 30 V | 60 V | 100 V |
| | % increase | 1 | 52 | 24 | 3 |

There was little change in 10 V or 100 V capacitance but a large change above 10 V through 60 V. Although this process is most suitable for a 10 to 60 V range, production lines are generally set up in 100 V or multiples of 100 V ranges. Therefore, this process will most likely be used for 0 to 100 V foil.

Capacitor foil which has been anodized in an adipate or other dicarboxylate electrolyte will pick up moisture and hydrate upon standing or storage. To prevent this, a small amount of phosphate is added to the anodization electrolyte or the final reanodization, after stabilizing or depolarizing the foil, is carried out in a phosphate electrolyte to heal the film and impart hydration resistance.

When the phosphate is incorporated into the main anodization electrolyte, 0.002 to 0.09% of it is used. When it is used as the final electrolyte, an aqueous 0.05 to 0.5% solution is used. While any soluble phosphate may be used, monosodium or monoammonium phosphate is preferred.

Generally, an aqueous solution containing 5% adipate as formation electrolyte is preferred, but 0.5 to 12% may be used.

What is claimed is:

1. In the manufacture of low-voltage aluminum foil electrolytic capacitor electrodes including etching said foil, cleaning it, and anodizing said foil, the improvement comprising thermal treating said cleaned foil at about 595° to 650° C. and then anodizing said treated foil in an adipate formation electrolyte.

2. A process according to claim 1 wherein said adipate is selected from the group consisting of alkali metal and ammonium adipates.

3. A process according to claim 2 wherein said formation electrolyte contains a phosphate salt.

4. A process according to claim 3 wherein 0.5 to 12% of said adipate and 0.002 to 0.09% of said phosphate are present.

5. A process according to claim 4 wherein 5% of said adipate and 0.05% of said phosphate are present.

6. A process according to claim 2 wherein said foil is subjected to a final reanodization in a phosphate salt electrolyte.

7. A process according to claim 6 wherein an aqueous solution of 0.5 to 12% adipate is used as main formation electrolyte and an aqueous solution of 0.05 to 0.5% phosphate is used as final anodization electrolyte.

* * * * *